(12) United States Patent
Stierle (10) Patent No.: US 9,150,309 B2
(45) Date of Patent: Oct. 6, 2015

(54) FASTENING SYSTEM FOR HANGING MOUNTABLE OVERHEAD CONTAINERS

(75) Inventor: Holger Stierle, Weil der Stadt (DE)

(73) Assignee: SFS intec Holding AG, Heerbrugg (CH)

( * ) Notice: Subject to any disclaimer, the term of this patent is extended or adjusted under 35 U.S.C. 154(b) by 728 days.

(21) Appl. No.: 13/383,322

(22) PCT Filed: Jul. 7, 2010
(Under 37 CFR 1.47)

(86) PCT No.: PCT/EP2010/059694
§ 371 (c)(1),
(2), (4) Date: Jan. 10, 2012

(87) PCT Pub. No.: WO2011/009718
PCT Pub. Date: Jan. 27, 2011

(65) Prior Publication Data
US 2012/0145829 A1 Jun. 14, 2012

(30) Foreign Application Priority Data
Jul. 24, 2009 (DE) .......................... 10 2009 026 250

(51) Int. Cl.
*B64D 11/00* (2006.01)
(52) U.S. Cl.
CPC ..................................... *B64D 11/003* (2013.01)
(58) Field of Classification Search
CPC ..................................................... B64D 11/003
USPC .................... 403/72, 73, 108, 150, 154, 155, 403/315–317, 321, 322.1, 322.3, 322.4, 403/324, 325, 326; 244/131, 118.1, 129.4
See application file for complete search history.

(56) References Cited

U.S. PATENT DOCUMENTS

| | | | | |
|---|---|---|---|---|
| 4,243,192 A | * | 1/1981 | Johnson | 244/215 |
| 4,243,342 A | * | 1/1981 | Marto | 403/324 |
| 5,104,064 A | * | 4/1992 | Kuitems | 244/118.1 |
| 5,108,048 A | | 4/1992 | Chang | |
| 5,265,991 A | * | 11/1993 | Herrick et al. | 410/69 |
| 6,517,027 B1 | * | 2/2003 | Abruzzese | 244/129.4 |
| 2004/0096263 A1 | | 5/2004 | Aquino et al. | |
| 2007/0284479 A1 | | 12/2007 | Pein et al. | |

FOREIGN PATENT DOCUMENTS

| | | |
|---|---|---|
| DE | 102008048499 | 5/2010 |
| EP | 0514957 | 11/1992 |

OTHER PUBLICATIONS

"Cabin Development—New Approach for the A350—Cabin Customization" One (magazine), German edition, Dec. 18, 2006, p. 23.

* cited by examiner

*Primary Examiner* — Daniel Wiley
(74) *Attorney, Agent, or Firm* — Volpe and Koenig, P.C.

(57) ABSTRACT

A fastening system (10) for hanging mountable overhead containers (12) is provided. The system includes at least one pair of support lugs (20, 22) mounted on a support structure (14) or on the overhead container (12). The support lugs (20, 22) can be detachably connected to each other by a pin (30) that can be drawn back in a pin guide (40) and thereby spring-loaded in the exit direction. When the support lug (22) attached to the overhead container (12) is inserted into the support lug (20) having the pin guide (40) when installing the container, the pin (30) is unlatched in the pin guide (40) and automatically moves out into the support eye (22) attached to the overhead container (12). Using a lever joined (60) to the pin guide (40) by a hinge, the pin (30) can be moved out completely into an end position, and locked in said position. In order to remove the overhead container (12), the lever (60) must simply be pivoted back.

7 Claims, 6 Drawing Sheets

FASTENING SYSTEM FOR HANGING MOUNTABLE OVERHEAD CONTAINERS

BACKGROUND

The invention relates to a fastening system for hanging, mountable overhead containers, such as baggage compartments in aircraft, with at least one pair of support lugs attached to a support structure or to an overhead container, with a pin for the detachable interconnection of the support lugs, and with receptacle sleeves for the pin, wherein these sleeves are attached to the support lugs and are flush with each other in a mounted position of the overhead container. Below, such a fastening system is indeed described in its use for the mounting of overhead containers, such as baggage compartments, on the support structure of aircraft, but such a fastening system could be used anywhere the task is to mount hanging overhead containers. One support lug provided with the pin guide is indeed fastened advantageously to the support structure, but the support lugs of a pair could be interchanged. In the development of cabins for newer types of aircraft, such as, for example, the Airbus A350, one goal is to design each element to be fastened to the fuselage of the aircraft, such as restrooms, galleys, passenger seats, cabin power networks, cabin lighting, and air nozzles, overhead containers, and rear-panel shelves, as a complete cabin module, wherein, however, all of the connection points should be constructed as flexible, standardized interfaces and wherein simplified fastener designs should be used that allow assembly and disassembly without the use of tools (cf., the article "Cabin Development—New Approach for the A350—Cabin Customization," One (magazine), German edition, Dec. 18, 2006, pg. 23).

In a known fastening system of the type noted above, which is used for the hanging assembly of baggage compartments in aircraft, more than three persons are required for the assembly of each baggage compartment. At least three persons lift the baggage compartment into an assembly position. The support lugs of each pair are connected to each other by a respective bolt (which is a loose part). For the assembly of these bolts, special tools, such as hammers, pliers, etc. are required. Furthermore, the known fastening system does indeed allow a secure fastening of the baggage compartments to the support structure, wherein the fastening system distinguishes itself through light weight, good force absorption, low parts prices, and a small number of components, but in contrast to these features, it has long assembly and disassembly times, a relatively large number of persons required for the assembly and disassembly of a baggage compartment, and the requirement of tools. The loose bolts can also be lost. These restrictions lead to the result that, in the cabin configuration of aircraft, attention must be given to managing with as few variants as possible. This is associated with a loss of flexibility in the cabin configuration. A disadvantageous effect is that the disassembly is complicated, because the bolts can be detached again only with difficulty and typically only with special tools.

From the document EP 0 514 957 A1, a fastening system for hanging mountable overhead containers such as baggage compartments on an airplane is known, that uses suspended mounting rails that are attached to the fuselage of the aircraft. The baggage compartments are mounted rollers which engage in longitudinal cavities formed in the rails. To lock the hanging-mounted luggage compartments, two types of locks are used, namely, overhead bars, which are fastened to the rails and keep the wheels on the rails, but manually releasable, so that the rollers and thus the luggage compartments can be removed from the rails. The second type of locking is done by outboard couplings, the compartments are mounted on the ceilings and engage outboard bolts which are fastened to the supporting structure. The outboard bolts are coupled to the overhead rails and work simultaneously with the overhead rails. A mechanic can manually operate the overhead bars, whereby both the overhead bars as well as moving the outboard latch in the unlocked position allow removal of the ceiling compartment. The outboard bolts are used to further secure the baggage compartments in their position however, they do not provide a support function for the suspended installation of baggage compartments.

SUMMARY

The objective of the invention is to form a fastening system of the type noted above while maintaining the assembly with pins and eyebolts such that it allows a quicker and easier assembly and disassembly of overhead containers, such as baggage compartments, to a support structure, in particular, in wide-bodied aircraft, wherein the assembly and disassembly should be possible with two persons, without special tools, and without loose parts.

This objective is thereby met according to the invention in that a compression spring (34) for biasing and retraction of the pin is arranged in the pin guide (40), and that for locking the retracted pin (30) a transversely of the pin (30) movable locking element (42) is located in a recess (44) in one of the pins (30), and that a lever (60) is hinged to manually pull back the pin (30) into the pin guide (40) and for further extension of the pin (30) into the receptacle sleeve (26) of an support lug (20).

In the fastening system according to the invention, the not-extended pin is located under spring biasing tension in the pin guide. The pin is thus not a loose part, but instead captively assembled in advance on one of the support lugs of the pair. This allows the assembly of an overhead container by fewer persons than in the prior art, because the overhead containers merely need to be lifted until the receptacle sleeves attached to the support lugs are essentially flush with each other. In this way, the pin is unlocked that is then extended by the existing spring biasing tension into the receptacle sleeve of the other support lug. Thus, the overhead container is already locked onto one support lug. The pin could then be extended completely by hand if necessary and inserted into the receptacle sleeve of one support lug. The disassembly is possible in the reverse sequence just as easily, without a special tool being required for extending and retracting the pin. One of the persons who have lifted the overhead container upward into the assembled position is free after the first locking of the other support lug to the first support lug and can work on the final extension of the pin. The fastening system according to the invention thus allows a simpler assembly and disassembly of hanging, mountable overhead containers, such as baggage compartments, in aircraft with less effort by personnel. The safety is also therefore increased, because there are no loose parts that could be lost and could cause disruptions. Simultaneously, more flexibility is achieved for the cabin equipment. The simple fastening system according to the invention allows many more variants than in the prior art.

In the fastening system according to the invention, a first locking element moving transverse to the pin engages in a recess formed on the pin for locking the retracted pin. This allows the pin retracted into the pin guide to be locked detachably in this position in which it is spring-loaded with the help of the first locking element that engages in the recess formed on the pin. The first locking element is unlocked in that the receptacle sleeves of the support lug pair are brought at least approximately into alignment. As soon as the first locking element leaves the recess formed on the pin, the pin is extended into the receptacle sleeve of the first support lug provided with the pin guide due to the spring biasing tension.

Further, in the fastening system according to the invention, a compression spring is arranged in the pin guide for the biasing and extending of the pin. This compression spring is tensioned in the retracted position of the pin, so that the automatic extending of the pin is guaranteed as soon as the locking element is removed from the recess formed on the pin.

Additionally, in the fastening system according to the invention, a lever is hinged on the pin guide for the manual retraction of the pin into the pin guide and for the extension of the pin into the receptacle sleeve of the first support lug. Through the biasing by the compression spring, the pin is extended into the receptacle sleeve of the other support lug when the pin is unlocked. With the lever, the pin can then be extended farther by hand until its free end is located in the receptacle sleeve of the first support lug provided with the pin guide. This end position of the pin corresponds to a final position of the lever that simultaneously thus prevents a retraction of the pin into the pin guide.

In a construction of the fastening system according to the invention, the locking element is a part of a release bracket that is supported so that it can move on the first support lug and can be displaced through the other support lug when the receptacle sleeves of the support lugs are brought into alignment. By lifting the overhead container into the assembled position, the release bracket is activated by the other support lug. In this way, the locking element is moved out from the recess formed on the pin, so that the pin is then extended automatically due to its spring biasing, in order to lock the other support lug on the first support lug provided with the pin guide.

In another construction of the fastening system according to the invention, the release bracket is biased in the direction of the pin guide and the receptacle sleeve of the first support lug by at least one additional compression spring. In this way it is guaranteed that the locking element engages in the recess formed on the pin as long as the other support lug has not been introduced into the first support lug provided with the pin guide, in order to lift the release bracket.

In another construction of the fastening system according to the invention, the lever can be locked detachably in a closed position by a securing device. In this way, the lever itself is also secured against undesired backward movement. The fastening system is thus secured against detachment of the pin, whether due to vibrations or other mechanical conditions.

In another construction of the fastening system according to the invention, the lever engages in the closed position with its free end in a spring-loaded part of the securing device and is held back by this part. For this purpose, it would be sufficient to form an opening in which one end of the lever engages when closed in the spring-loaded part of the securing device.

Therefore, because the lever can be locked detachably in the closed position by the securing device, it is guaranteed that the lever and thus the pin cannot move backward unintentionally from the receptacle sleeve. When lifting and inserting the other support lug with the overhead container, it must be guaranteed that the pin is retracted into the pin guide in the opened state. The other support lug thus could be positioned unimpaired with its receptacle sleeve in the axis of the pin. Only through the mechanical detachment of the locking element from the pin, this could penetrate into the receptacle sleeve of the first support lug provided with the pin guide through the biasing loading of its compression spring.

In another construction of the fastening system according to the invention, a spring that brings the lever from its closed position when the securing device is detached is attached to the lever. Therefore, the lever in the closed position is pressed against the opening or a stop on the spring-loaded part of the securing device. The securing effect is thus not only reinforced, but the lever is automatically folded up at least to a certain extent when the securing device is released. Therefore it is easier to grip the lever by hand and to release the support lugs completely from each other by moving the pin backward into the pin guide.

In another construction of the fastening system according to the invention, the lever forms, with a connection element hinged on the pin, an articulated lever for extending and retracting as well as for securing the pin. After the pin has been pushed by its compression spring automatically into the receptacle sleeve of the other support lug, through subsequent closing of the lever, the mutual locking of the support lugs through the pin can now be finally secured.

In another construction of the fastening system according to the invention, a first pair of support lugs and a second pair of support lugs are attached to each other at two adjacent hanging points of two adjacent overhead containers to a multiple-compartment mounting bracket attached to the support structure. The arrangement is here affected so that, in the case of assembled overhead containers, for example, the first overhead container with the first support lug pair is prevented from evasive movement in the X, Y, and Z directions and the other overhead container with the second support lug pair is prevented from evasive movement in the Y and Z directions.

BRIEF DESCRIPTION OF THE DRAWINGS

Embodiments of the invention are explained in detail below with reference to the drawings. Shown are.

DETAILED DESCRIPTION OF THE PREFERRED EMBODIMENTS

Figure 1:
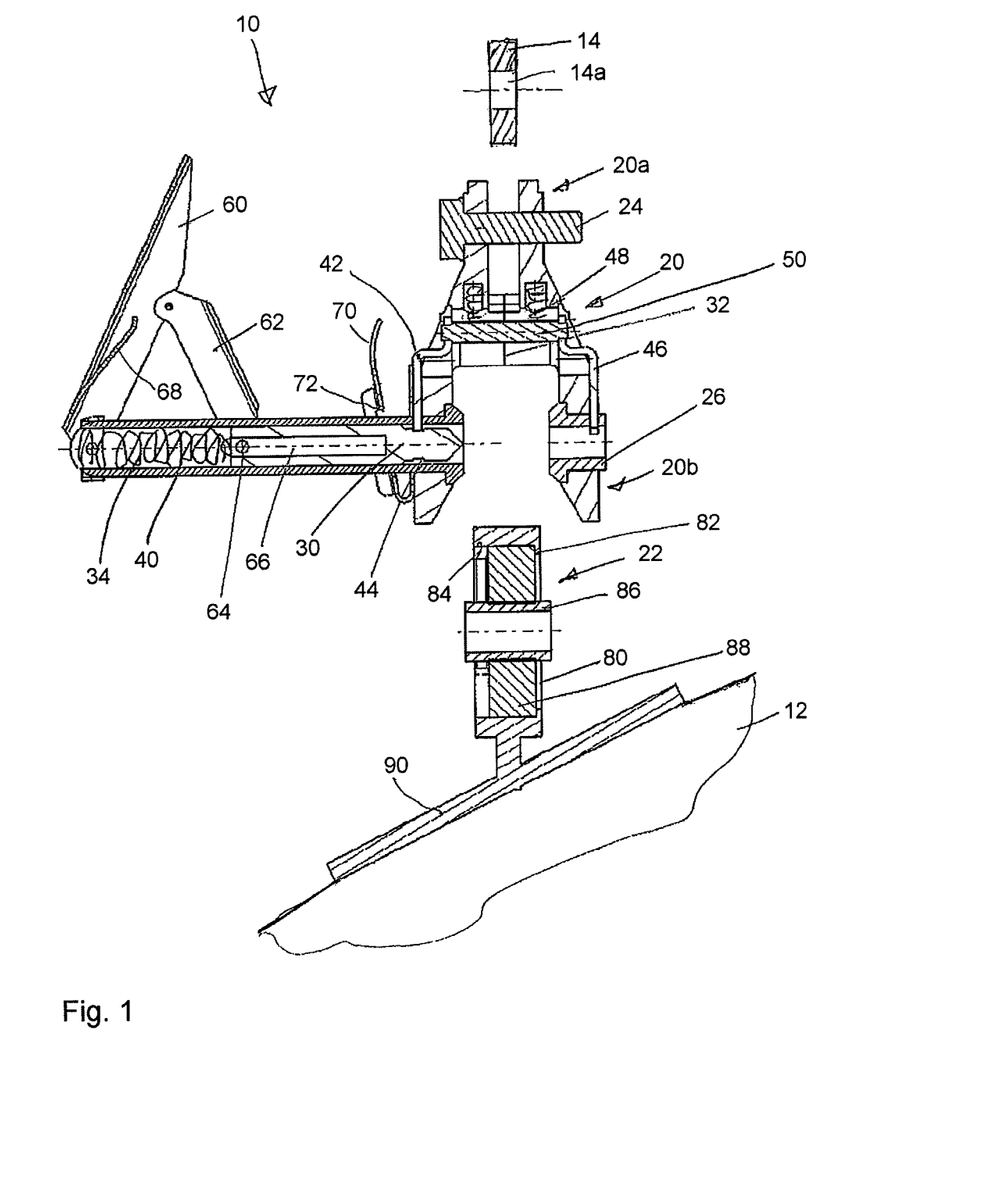
FIG. 1 is a longitudinal section view of a fastening system according to the invention in the disassembled state.

FIG. 1 shows, in a longitudinal section view, a fastening system designated overall with 10 for the hanging assembly of an overhead container 12 only indicated in FIG. 1 on a support structure 14 only indicated in FIG. 1. The overhead container 12 could involve a baggage compartment or the like in an aircraft. The fastening system 10 comprises a pair of support lugs that are designated overall with 20 or 22. The support lug 20 is formed for attaching to the support structure 14. The support lug 22 is attached to the overhead container 12. The two support lugs 20, 22 could be interchanged, as already mentioned above. The fastening system 10 is shown in FIG. 1 in the disassembled state, that is, the support lugs 20, 22 are not connected to each other by a pin 30, as shown for the assembled state in FIG. 3, but instead still separated from each other. Using the pin 30, the support lugs 20, 22 can be connected detachably to each other. Consequently, the two support lugs will now be described first in detail.

The support lug 20 is a component on which two forks are formed, namely an upper fork 20a in the diagram in FIG. 1 and a lower fork 20b in the diagram in FIG. 1. For fastening the support lug 20 on the support structure 14, this is accommodated between the two legs of the upper fork 20a. A tight connection is produced with the help of a screw 24 that is guided through the passage hole 14a into the support structure 14. For fixing the screw in the upper fork 20a, a not-shown nut or a threaded hole formed in the fork leg at the right in FIG. 1 could be used. A multiple-compartment mounting bracket 100 could be arranged between the upper fork 20a and the support structure 14 according to FIG. 5, wherein this mounting bracket will be discussed in detail farther below. In the right leg of the lower fork 20b, a receptacle sleeve 26 for the pin 30 is attached. In the left leg of the lower fork 20b, that is, flush with the receptacle sleeve 26, a pin guide 40 is attached as shown on the axis of the receptacle sleeve 26. The two forks 20a and 20b and thus the support lug 20 are divided along a joint 32 and thus can be disassembled as can be recognized in FIG. 6 in the exploded-view diagram in which the support lug 20 is shown at the top left.

The pin 30 is shown retracted into the pin guide 40 in FIG. 1. The pin 30 is locked in the retracted position by a locking element 42 that moves transverse relative to the pin and engages in a recess 44 formed on the pin 30. The recess 44 is formed in the shown embodiment as a ring groove. The locking element 42 is a part of a release bracket 46 that is supported so that it can move on the support lug 20 and is biased in the direction of the pin guide 40 and the receptacle sleeve 26 of the support lug 20 by two compression springs 48. The release bracket has two legs of which the first is a locking element 42 and of which the other is formed like the locking element 42 but is used only as a guide. These two arms are connected rigidly to each other by a transverse pin 50. The support lug 22 comes in contact with the transverse pin 50 when the overhead container 12 is lifted, in order to bring the support lugs mutually into an assembled position that is described in even more detail farther below. Due to the biasing loading by the compression springs 48, the locking element 60 remains locked in the recess 44 of the pin 30 and thus the pin 30 remains in its position shown in FIG. 1 in which it is biased by a compression spring 34 in the direction of the receptacle sleeve 26 as long as the release bracket 46 is not lifted by the support lug 22. The compression spring 34 is indicated in FIG. 1 and is not shown in FIG. 6.

A lever 60 is hinged on the pin guide 40. A connection element 62 is hinged at its one end on the lever 60 and at its other end on the pin 30. The hinged connection on the pin 30 comprises a hinge pin 64 that projects outward into two opposing longitudinal slots 66 of the pin guide 40 and is supported in two corresponding holes of the connection element 42. The lever 60 thus forms, with the connection element 62, an articulated lever for extending and retracting as well as for securing the pin 30. By pivoting the lever 60 in the counterclockwise direction in the position shown in FIG. 1, the pin 30 is retracted in the pin guide 40 until the locking element 42 engages in the recess 44. When pulled back, the compression spring 34 is tensioned. For extending the pin 30 from the pin guide 40, which is described in detail farther below, the lever 60 is pivoted in the clockwise direction until it lies on the pin guide 40 in a closed position shown in FIG. 3. The pin guide 40 carries a securing device 70 that is formed as a type of spring bracket. When the lever 60 is pivoted in the clockwise direction, it presses, with its free end, the securing device 70 in FIG. 1 to the right and finally reaches, with its free end, into an opening 72, whereupon the securing device 70 is pivoted back and the lever 60 is held tight in the closed position. A leaf spring 68 that brings the lever 60 out from the closed position when the securing device 70 is released is attached to the lever 60.

The support lug 22 comprises a lug 80 in which a receptacle sleeve 86 is supported centrally for the pin 30 in an impact damping bushing 88. The impact damping bushing 88 is supported in the lug 80 in FIG. 1 at the right on a ring shoulder 82 and is held by a spring ring 84 in the lug 80. The lug 80 is part of a bracket 90 that is fastened to the outside of the overhead container 12.

Figure 2:
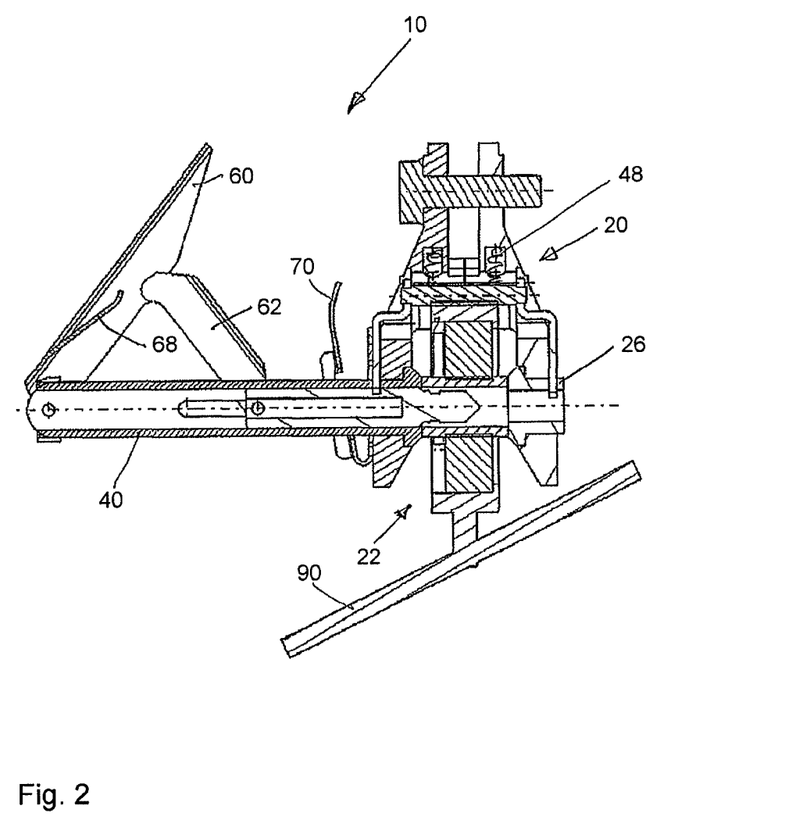
FIG. 2 is a view of the fastening system according to FIG. 1 in a first phase of an assembled state.

With reference to the diagram in FIGS. 1-3, the assembly and the disassembly of the overhead container 12 will now be described. FIG. 1 shows the starting positions of the support lugs 20 and 22. In the starting position of the support lug 20, the pin 30 is inserted into the pin guide 40 and locked by the locking element 42. The compression spring 34 is tensioned. Several persons now lift the overhead container 12 until the support lug 22 impacts against the transverse pin 50 of the release bracket 46 and presses the release bracket 46 upward. Therefore, the locking element 42 is lifted and leaves the recess 44. Here, the receptacle sleeves 26 and 86 of the support lugs 20 or 22 are brought into alignment. Through the tensioned compression spring 34, the now unlocked pin 30 is pushed into the receptacle sleeve 86 of the support lug 22 as shown in FIG. 2. The lever 60 is here automatically pivoted somewhat in the clockwise direction, as also shown in FIG. 2. The overhead container 12 is now already locked in advance to the support lug 20, so that at least one of the persons who have lifted the overhead container 12 into the assembled position is free to actuate the lever 60 and to secure the overhead container 12 finally in its assembled position. For this purpose, the operator pivots the lever 60 from the position shown in FIG. 2 farther in the clockwise direction into the closed position shown in FIG. 3 in which the leaf spring 68 lies on the pin guide 40 on the outside, just like the lever 60, wherein the lever 60 is held in this position by the securing device 70. When moving into this closed position, the pin 30 is shifted farther to the right by the lever 60 by the connection element 62 until it assumes the position shown in FIG. 3 in which the pin 30 is received into the receptacle sleeve 26 of the support lug 20.

Figure 3:
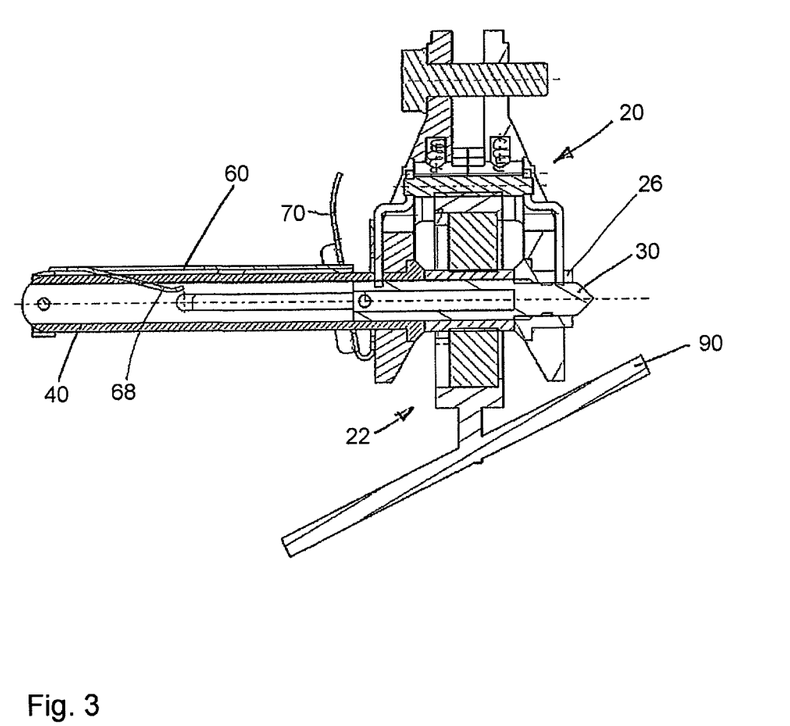
FIG. 3 is a view of the fastening system according to FIG. 1 in a completely assembled state.

For disassembly of the overhead container 12, the securing device 70 is moved somewhat to the right from the position shown in FIG. 3 until the securing device 70 releases the lever 60. This is pressed somewhat upward by the leaf spring 68 that is supported on the pin guide 40, so that it can be easily gripped by hand and can be moved in the counterclockwise direction via the position according to FIG. 2 into the final position according to FIG. 1 in which the pin 30 is pulled back again into the pin guide 40, the locking element 42 is locked again in the recess 44 and the compression spring 34 is tensioned again.

Figure 4:
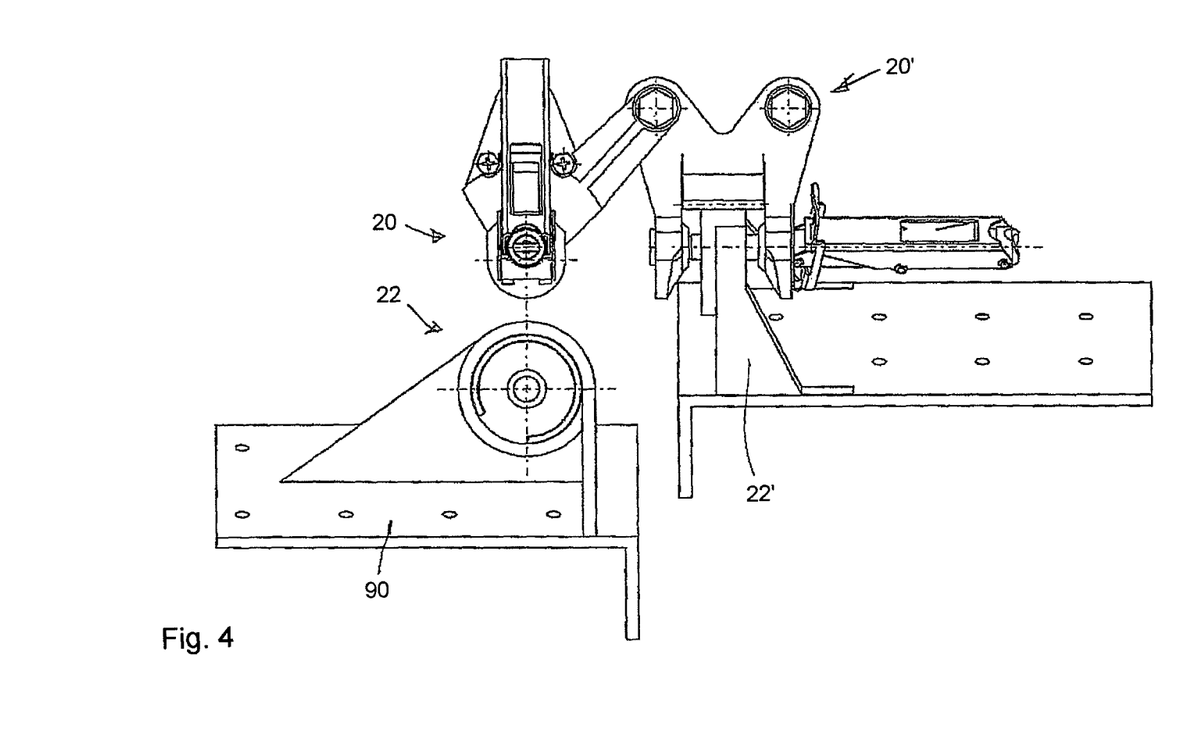
FIG. 4 is a view of a fastening system according to the invention with two pairs of support lugs for the simultaneous fastening of two adjacent overhead containers at two adjacent hanging points, wherein one support lug pair is shown in the mounted state and one support lug pair is shown in the disassembled state.
Figure 5:
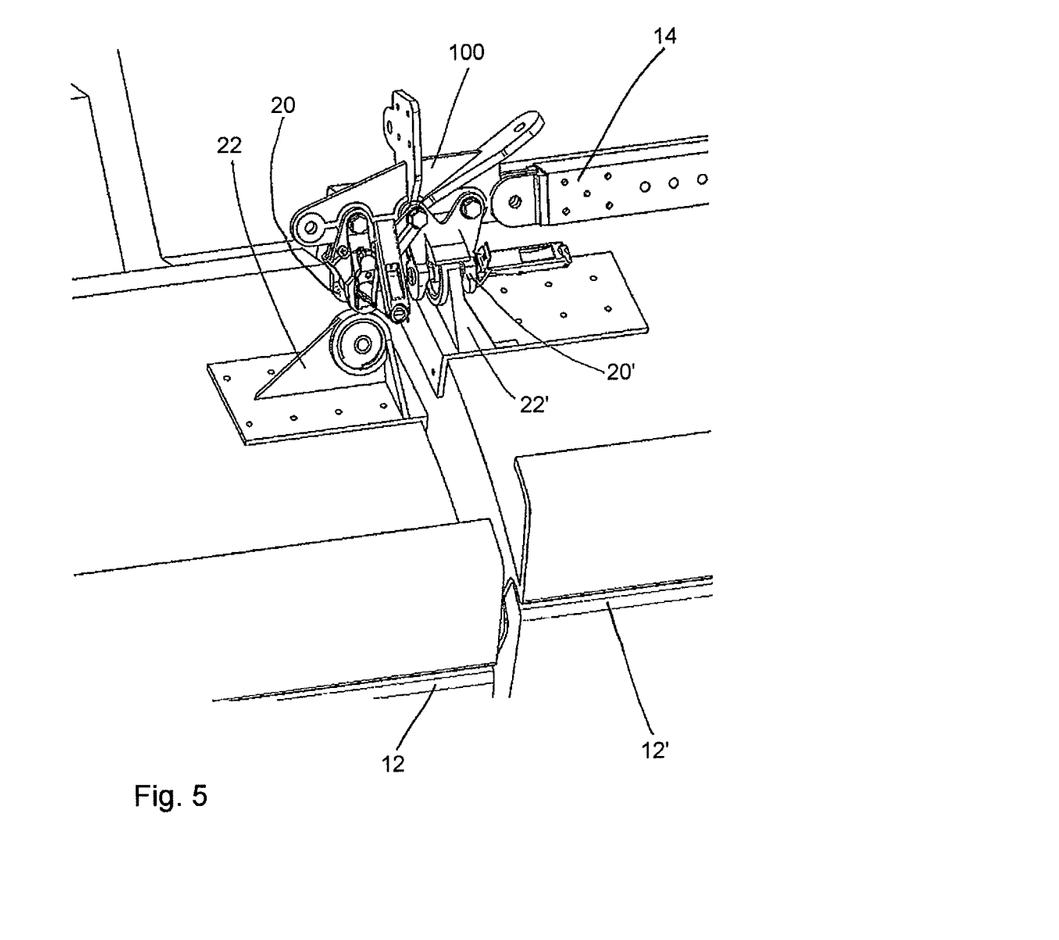
FIG. 5 is a perspective view of the fastening system according to FIG. 4.
Figure 6:
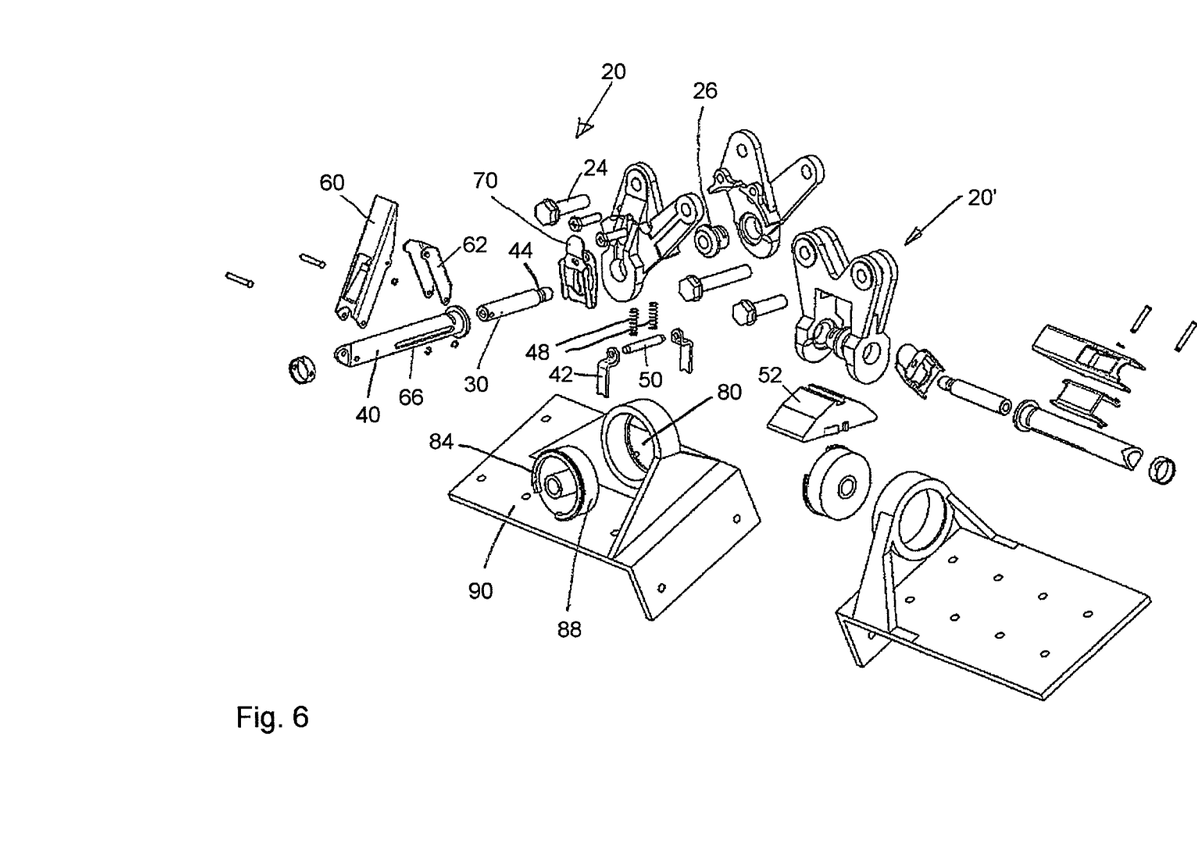
FIG. 6 is an exploded view of the fastening system according to FIGS. 4 and 5.

According to the diagram in FIGS. 4-6, a first pair of support lugs 20, 22 and a second pair of support lugs 20', 22' are attached one next to the other at two adjacent hanging points of two adjacent overhead containers 12, 12' to a multiple-compartment mounting bracket 100 affixed to the support structure 14 and, indeed, in the assembled state in FIG. 5 and in the disassembled state in FIG. 4. The support lug 20' differs from the support lug 20 only in that it is not divided along a joint and that it also still has a centering cap 52 that guides the support lug 22' into a central position, in order to simplify bringing the receptacle sleeves 36, 86 into alignment. The support lug 20 itself is shaped on the inside so that the support lug 22 is guided into a central position.

LIST OF REFERENCE SYMBOLS

10 Fastening system
12, 12' Overhead container
14 Support structure
14a Passage hole
20, 20' Support lug
20a Upper fork
20b Lower fork
22, 22' Support lug
24 Screw
26 Receptacle sleeve
30 Pin
32 Joint
34 Compression spring
36 Receptacle sleeve
40 Pin guide
42 Locking element
44 Recess
46 Release bracket
48 Compression spring
50 Transverse pin
52 Centering cap
60 Lever
62 Connection element
64 Link pin
66 Longitudinal slot
68 Leaf spring
70 Securing device
72 Opening
80 Lug
82 Ring shoulder
84 Spring ring
86 Receptacle sleeve
88 Impact damping bushing
90 Bracket
100 Multi-compartment mounting bracket

The invention claimed is:

1. A fastening system (10) for mounting hanging overhead containers (12) to an aircraft, the fastening system (10) comprising:
at least one pair of support lugs (20, 22), wherein one support lug (20) is attached to a support structure of the aircraft while the other support lug (22) is attached to the overhead container (12);
a pin (30) for interconnecting the at least one pair of support lugs (20, 22), wherein the pin (30) is moveable between a retracted position and an extended position and comprises a recess (44);
receptacle sleeves (26, 86) for the pin (30), wherein one receptacle sleeve (26) is attached to the one support lug (20) while the other receptacle sleeve (86) is attached to the other support lug (22), and wherein the receptacle sleeves (26, 86) are flush with each other in a mounted position of the overhead container (12);
a pin guide (40) for the pin (30), wherein the pin guide (40) is attached to one of the at least one pair of support lugs (20, 22); and
a lever (60) for manual retraction of the pin (30) into the retracted position and for manual extension of the pin (30) into the extended position;
wherein the fastening system further comprises:
a compression spring (34) arranged in the pin guide (40) for biasing the pin (30) in a direction of the extended position when the pin (30) is in the retracted position;
a locking element (42) for locking the pin (30) in the retracted position, wherein the locking element (42) is movable in a direction transverse to the pin (30), and wherein the locking element (42) engages into the recess (44) for locking the pin (30); and
a release bracket (46) that includes the locking element (42), wherein the release bracket (46) is supported for movement on one of the at least one pair of support lugs (20, 22) and is displaced into an unlock position by the other one of the at least one pair of support lugs (20, 22) when the receptacle sleeves (26, 86) are flush with each other; wherein the pin (30) detachably interconnects the at least one pair of support lugs (20, 22), and wherein the locking element (42) releases the pin (30) by disengaging from the recess (44) when the release bracket (46) is displaced into the unlock position, such that the pin (30) biased by the compression spring (34) automatically extends into the receptacle sleeve of the support lug that displaced the release bracket (46) into the unlock position.

2. Fastening system according to claim 1, wherein the release bracket (46) is biased in a direction of the pin guide (40) and the receptacle sleeve (26) of the first support lug (20) by an additional compression spring (48).

3. Fastening system according to claim 1, wherein the lever (60) can be locked detachably in a closed position by a securing device (70).

4. Fastening system according to claim 3, wherein the lever (60) engages in the closed position with a free end thereof in a spring-loaded part of the securing device (70) and is held back by the spring-loaded part.

5. Fastening system according to claim 4, wherein a spring (68) is attached to the lever (60), and the spring brings the lever (60) out of the closed position when the securing device (70) is released.

6. Fastening system according to claim 5, wherein the lever (60) forms, with a connection element (62) hinged to the pin (30), an articulated lever for extending and retracting as well as for securing the pin (30).

7. Fastening system according to claim 1, wherein a first pair of the support lugs (20, 22) and a second pair of the support lugs (20', 22') are attachable one next to the other at two adjacent hanging points of two adjacent overhead containers to a multiple-compartment mounting bracket (100) attached to the support structure (14).

* * * * *